(12) United States Patent
Herbst

(10) Patent No.: US 10,528,830 B2
(45) Date of Patent: Jan. 7, 2020

(54) SYSTEM AND METHOD FOR REMOTE MONITORING OF A HUMAN

(71) Applicant: JUNGO CONNECTIVITY LTD., Netanya (IL)

(72) Inventor: Ophir Herbst, Herzliya (IL)

(73) Assignee: JUNGO CONNECTIVITY LTD., Netanya (IL)

( * ) Notice: Subject to any disclaimer, the term of this patent is extended or adjusted under 35 U.S.C. 154(b) by 102 days.

(21) Appl. No.: 15/619,489

(22) Filed: Jun. 11, 2017

(65) Prior Publication Data
US 2018/0357498 A1    Dec. 13, 2018

(51) Int. Cl.
G06K 9/00 (2006.01)
B60W 40/08 (2012.01)
G06K 9/20 (2006.01)
B60R 11/04 (2006.01)

(52) U.S. Cl.
CPC ......... *G06K 9/00845* (2013.01); *B60W 40/08* (2013.01); *G06K 9/209* (2013.01); *B60R 11/04* (2013.01); *B60W 2040/0818* (2013.01); *B60W 2420/42* (2013.01); *G06K 9/0061* (2013.01); *G06K 9/00281* (2013.01); *G06K 9/00335* (2013.01)

(58) Field of Classification Search
CPC ............... G06K 9/00845; G06K 9/209; G06K 9/00281; G06K 9/00335; G06K 9/0061; B60W 40/08; B60W 2420/42; B60W 2040/0818; B60R 11/04
See application file for complete search history.

(56) References Cited

U.S. PATENT DOCUMENTS

| | | | |
|---|---|---|---|
| 2014/0019167 A1* | 1/2014 | Cheng | G06Q 40/08 705/4 |
| 2015/0029014 A1* | 1/2015 | Bande Martinez | G08B 21/06 340/439 |
| 2016/0046298 A1* | 2/2016 | DeRuyck | B60W 40/09 340/576 |
| 2016/0267335 A1* | 9/2016 | Hampiholi | G06F 3/013 |

\* cited by examiner

*Primary Examiner* — Siamak Harandi
(74) *Attorney, Agent, or Firm* — Alphapatent Associates, Ltd; Daniel J. Swirsky

(57) ABSTRACT

A system and method for providing information of a driver's state, including receiving from a sensor in a vehicle information of a driver's state, receiving a signal of an unsafe driver's state and based on the signal of an unsafe driver's state, sending a portion of the information to a remote device.

18 Claims, 6 Drawing Sheets

SYSTEM AND METHOD FOR REMOTE MONITORING OF A HUMAN

FIELD

The invention relates to the field of monitoring a human, such as a human operator.

BACKGROUND

Human error has been cited as a primary cause or contributing factor in disasters and accidents in many and diverse industries and fields. For example, traffic accidents involving vehicles are often attributed to human error and are one of the leading causes of injury and death in many developed countries. Similarly, it was found that distraction (e.g., mental distraction) of a worker affects performance at work and is one of the causes of workplace accidents.

Therefore, monitoring human operators, such as workers or drivers of vehicles, is an important component of accident analysis and prevention.

Safety systems have been introduced into vehicles by several car companies. Safety systems typically monitor the driver's steering, acceleration, braking and use of other controls and detect when that behavior begins to change because of fatigue, at which time the system sounds an alert and triggers a warning message in the vehicle's instrument panel.

Some safety systems use an infrared camera positioned on the vehicle's steering column. Additionally, video based event detection systems have been suggested for use in monitoring elderly or other populations at risk, however these systems don't usually enable monitoring to prevent an event in advance but rather sound an alarm only once an event is detected.

SUMMARY

Embodiments of the invention provide systems and methods for efficiently and easily remotely monitoring a human operator's state. Embodiments of the invention enable automatic start of monitoring close to a possible event rather than requiring continuous monitoring to identify a possible event or being alerted only at onset of the event.

Additionally, monitoring the human operator, according to embodiments of the invention, provides feedback which can be used to update and improve the systems and methods.

Systems according to embodiments of the invention use an operator end device, a remote device and software to enable monitoring the operator's state at a remote site and to identify an operator's state that may lead to an event, in real time. Upon a sign of such a state (e.g., distraction, stress or drowsiness of the operator), information about the operator's state (e.g., live streams of images of the operator) are sent to one or more remote devices that are accessible to remote users such as call centers, employers, friends or family, who can monitor the operator substantially in real-time and call the operator and/or issue alarms to the operator and/or call for help if necessary.

In some embodiments information from the operator end device (such as short videos or images and alerts corresponding to the images) is sent to a data center that stores the information for analysis and/or updating and improving the methods and systems.

BRIEF DESCRIPTION OF THE DRAWINGS

The invention will now be described in relation to certain examples and embodiments with reference to the following illustrative drawing figures so that it may be more fully understood. In the drawings.

DETAILED DESCRIPTION

Embodiments of the invention provide systems and methods for remote monitoring of a state of a human operator or other person, such as elderly or sick people.

Embodiments of the invention enable monitoring a person (e.g., by monitoring at least part of the person, e.g., a person's face or part of the person's face) and identifying safety, health or stress situations in real time.

Although the examples described herein relate to a human operator, typically to a driver of a vehicle, it should be appreciated that embodiments of the invention may be used to monitor people at risk such as elderly or sick people as well as operators, such as drivers.

The terms "driver" and "driving" used in this description refer to any person monitored according to embodiments of the invention. In one example a "driver" and "driving" refers to an operator or operating of a vehicle and embodiments of the invention relate to operation of any vehicle (e.g., car, train, boat, airplane, etc.) or equipment. Although the following examples describe a driver of a vehicle, embodiments of the invention may also be practiced on human operators of machines other than vehicles, such as computers, home or industrial equipment and healthcare equipment.

A driver's (or other person's) state refers mainly to the level of distraction of the driver. Distraction may be caused by external events such as noise or occurrences in or outside the vehicle (or space where the driver or operator is operating), and/or by the physiological or psychological condition of the driver, such as illness, drowsiness, fatigue, anxiety, sobriety, inattentive blindness, readiness to take control of the vehicle, etc. Thus, a person's state may be an indication of the physiological and/or psychological condition of the person.

An unsafe state of a person (e.g., driver or other operator or person) refers to a person's state leading to a possible event, such as a health risk event or an event that could be detrimental to the operation of a vehicle or other machine. For example, a distracted (e.g., drowsy or anxious) state of a driver is typically an unsafe state of the driver. In another example, a distracted or otherwise not normal state of a person (e.g., above normal eye blinks, etc.) may indicate an undesirable psychological event or an imminent health risk event such as a stroke or heart attack and is considered an unsafe state of the person being monitored.

Figure 1:
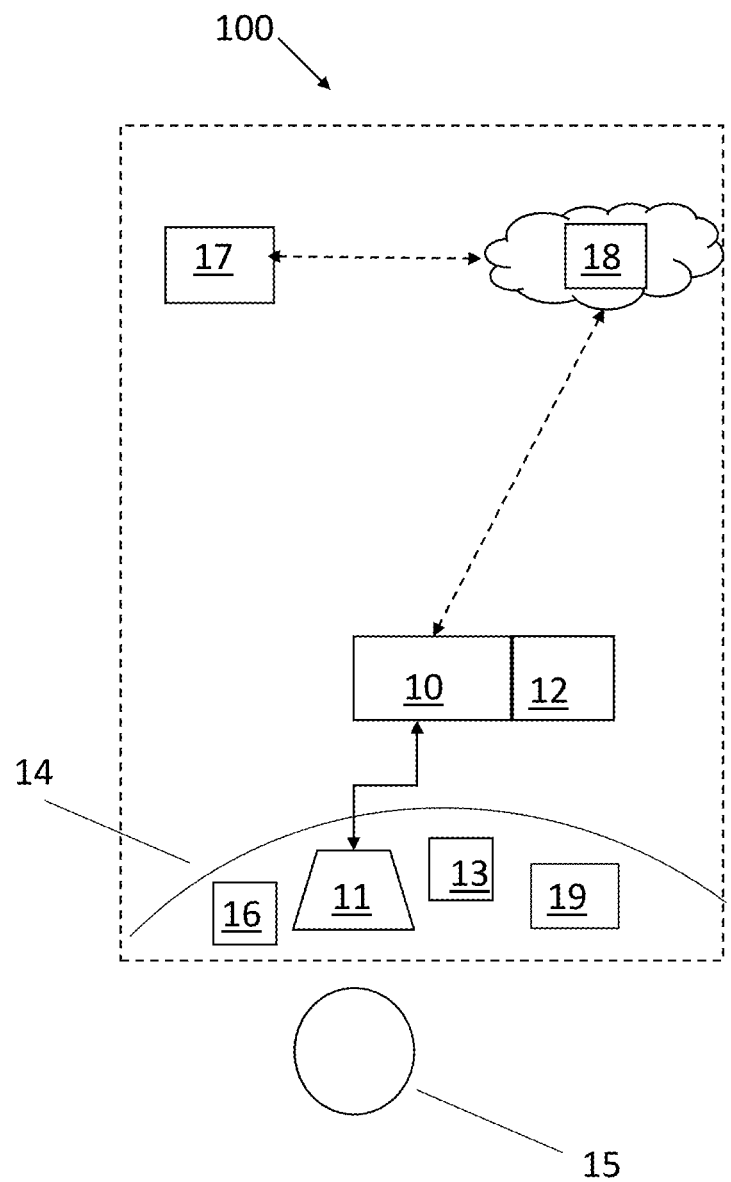
FIG. 1 is a schematic illustration of a system operable according to embodiments of the invention.

An example of a system operable according to embodiments of the invention is schematically illustrated in FIG. 1.

In the following description, various aspects of the invention will be described. For purposes of explanation, specific configurations and details are set forth in order to provide a thorough understanding of the invention. However, it will also be apparent to one skilled in the art that the invention may be practiced without the specific details presented herein. Furthermore, well known features may be omitted or simplified in order not to obscure the invention.

Unless specifically stated otherwise, as apparent from the following discussions, it is appreciated that throughout the specification discussions utilizing terms such as "processing," "computing," "calculating," "determining," "detecting", "identifying", "extracting" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In one embodiment a system 100 includes an operator end device, e.g., a sensor 11 located in a vehicle 14 to sense and collect information of a driver's state in the vehicle 14. The information of a driver's state may include real time and/or off-line data collected and/or stored by the sensor 11. In one embodiment the sensor 11 collects image data of a driver and the information includes real-time and/or offline image data of the driver. Image data may include data such as values that represent the intensity of reflected light as well partial or full images or videos.

The sensor 11, which is in communication with a controller 18, transmits the information to the controller 18. Typically, the controller 18 is part of a remote server possibly a cloud based server.

In one embodiment the controller 18 is in communication with a remote device 17 to enable and coordinate transfer of information from the sensor 11 to the remote device 17.

The remote device 17 is capable of displaying information to a remote user and may be operated by a remote user such as a call center, an employer, friends or family (of the driver), who can, based on the information from sensor 11 which is received and displayed at the remote device 17, monitor the driver's state in substantially real-time and call the driver and/or call for help if necessary.

In one embodiment information related to a driver's unsafe state is sent to remote device 17 based on automatic detection of a driver's unsafe state in real time from the data collected by sensor 11. In other embodiments information related to a driver's unsafe state is sent to remote device 17 based on input from the driver (e.g., if the driver feels drowsy or otherwise concerned about his state). Thus, system 100 may include a driver input unit 16 (which may be part of sensor 11 or part of an existing vehicle device or may be a stand-alone and/or dedicated unit) that can accept input from the driver and can cause information to be sent to remote device 17 based on the input from the driver.

Typically, only a portion of the information collected by sensor 11 (typically a portion relevant to a driver's unsafe state) is sent to remote device 17 so that only relevant portions of the information relating to the driver's state are monitored via remote device 17. Thus, remote device 17 may display a portion of information which relates to the driver's unsafe state, substantially in real-time.

In one embodiment only a portion of the information is sent from sensor 11, the determination which portion of information, being done at a processor associated with the sensor 11. In another embodiment, information is sent from sensor 11 to controller 18 and only a portion of the information is sent from controller 18 to the remote device 17, the determination which portion of information, being done at a processor associated with the controller 18.

The remote device 17, which is typically capable of displaying information to a remote user, may include a dedicated device or a standard multi-purpose computer, including mobile devices such as smart phones or tablets. Thus, for example, a family member of the driver may receive real-time information about the driver's state on his smart phone almost immediately upon detection of an unsafe state of the driver.

In another embodiment the remote device 17 may be part of a data center where the information transmitted from sensor 11 is stored. The data center may be accessed or operated by an external user to use the information for further analysis and/or to update and improve algorithms run by the system 100.

In one embodiment, controller 18 is pre-set with a unique ID which enables it to get from the remote device 17 (e.g., through an application on the remote device) information regarding where to stream data from sensor 11.

In one embodiment the sensor 11 includes an imager that obtains image data of the driver.

In one embodiment, the imager obtains images that include at least part of the driver, such as the driver's head 15. For example, one or more imagers may be positioned on a car's windshield, on the sun visor of the car, on the dashboard, on the A-pillar, in the instruments cluster, on the front mirror of the car, on a steering wheel of a vehicle or front window of a vehicle such as a car, aircraft, ship, etc. In one embodiment the sensor 11, e.g., including an imager, may be located at any location in the vehicle 14 so long as the imager has a field of view (FOV) that enables obtaining image data of at least the driver's head 15 or part of the driver's head (e.g., the driver's eyes or mouth). Similarly, a sensor 11 may be placed at any location in a home, workplace or other environment to enable obtaining image data of at least part of a monitored person.

An imager typically includes a CCD or CMOS or other appropriate chip. The imager may be part of a 2D or 3D camera. For example, the imager may be part of a standard camera provided with mobile devices such as smart phones or tablets. In one embodiment several imagers may be used to obtain a 3D or stereoscopic image of at least the driver's head 15.

In one embodiment sensor 11 obtains images at a high frame rate (e.g., 30 frames per second or higher) to achieve real-time imaging.

In some embodiments the system 100 includes one or more illumination sources 13 such as an infra-red (IR) illumination source, to facilitate imaging (e.g., to enable obtaining image data of the driver even in low lighting conditions, e.g., at night).

The sensor 11 typically includes or is in communication with a processing unit 10 and a memory 12. Processing unit 10 detects from the information collected by sensor 11 an unsafe driver's state and based on the detection generates a signal to send a portion of the information to the remote device 17. In the case where the sensor 11 obtains information which includes image data of the driver (e.g., of the driver's head 15), the processing unit 10 detects the unsafe state of the driver from the image data, for example from biometric parameter values extracted from images of the driver (as detailed below).

In some embodiments processing unit 10 may receive a signal from the driver input unit 16 to detect an unsafe state of the driver.

In embodiments in which sensor 11 includes an imager, processing unit 10 (or another processor) may be used to identify the driver in images obtained from the imager and to associate the identified driver to specific biometric parameter values.

Processing unit 10 may track a driver's head 15 or face in a set of images obtained from sensor 11 and extract biometric parameter values of the driver based on the tracking. In one embodiment biometric parameter values of a specific driver obtained from a first set of images are used to represent the baseline or normal state of the driver and may thus be used as a reference frame for biometric parameter values of that same driver obtained from a second, later captured, set of images.

Processing unit 10 may run computer vision algorithms and processes to determine biometrics from images obtained from sensor 11. For example, face detection and/or eye detection algorithms (including computer vision, machine learning and deep learning processes) may be used to detect a driver's face and/or features of the face (such as eyes) in the images. Tracking of the head or face, e.g., to detect head and/or eye movement, may be done by applying optical flow methods, histogram of gradients, deep neural networks or other appropriate detection and tracking methods.

Parameters such as direction of gaze or posture or position of a driver's head may be determined by applying appropriate algorithms (and/or combination of algorithms) on image data obtained from sensor 11, such as motion detection algorithms, color detection algorithms, detection of landmarks, 3D alignment, gradient detection, support vector machine, color channel separation and calculations, frequency domain algorithms and shape detection algorithms.

The processing unit 10 may output information which includes an alert signal generated when an unsafe driver's state is detected from image data, for example, based on the biometric parameter values calculated by processing unit 10.

In some embodiments processing unit 10 may mark images in which an unsafe driver's state is detected or the processing unit 10 may correlate images to the alert signal. For example, images from a time period which includes the generation of the alert signal and/or a signal from the driver input unit 16, may be marked. The marked or correlated images may be transmitted from sensor 11, e.g., to remote device 17. Thus, in one embodiment, only the portion of information which includes image data correlating to the signal generated by the processing unit 10, is sent to the remote device 17. In some embodiments the portion of information includes image data correlating to the signal generated by the driver input unit 16.

Some or all of the information e.g., images of a driver, may be stored locally on appropriate media in system 100 and processes according to embodiments of the invention, may occur locally, e.g., at processing unit 10.

In some embodiments, information is stored on cloud storage, e.g., on controller 18. Additionally, processes according to embodiments of the invention, may occur in the cloud. For example, detecting an unsafe state of a driver from information (e.g., image data) sent from the sensor 11 and/or correlating the information to the unsafe state of the driver, may be done at controller 18.

Communication between components of the system 100 and/or external components (such as sensor 11, remote device 17 and controller 18) may be through wired or wireless connection. For example, the system 100 may include an internet connection.

Processing unit 10 may include, for example, one or more processors and may be a central processing unit (CPU), a digital signal processor (DSP), a Graphical Processing Unit (GPU), a microprocessor, a controller, a chip, a microchip, an integrated circuit (IC), or any other suitable multi-purpose or specific processor or controller.

In some embodiments processing unit 10 is a dedicated unit. In other embodiments processing unit 10 may be part of an already existing vehicle processor, e.g., the processing unit 10 may be one core of a multi-core CPU already existing in the vehicle, such as in the vehicle IVI (In-Vehicle Infotainment) system, telematics box of the vehicle, domain controller or another processor associated with the vehicle.

Memory unit(s) 12 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

According to some embodiments image data may be stored in memory 12. Processing unit 10 can apply image analysis algorithms, such as known motion detection and shape detection algorithms and/or machine learning processes in combination with methods according to embodiments of the invention to analyze image data, e.g., to detect an unsafe state of a driver from the images and/or obtain biometrics based on tracking of a driver's head and/or face in a set of images and to extract values (which may include statistical properties) from the obtained biometrics.

Biometric parameters extracted from image data of the driver, typically by using computer vision techniques, include parameters indicative of the driver's state, such as, one or more eye pupil direction, pupil diameter, head rotation, blink frequency, blink length, mouth area size, mouth shape, percentage of eyelid closed (perclos), location of head, head movements and pose of the driver.

In one example, sensor 11 obtains 30 frames per second and each of the frames is analyzed (biometric values extracted from each frame compared to baseline values) by processing unit 10. In 2 seconds 60 comparisons are accumulated. Processor 10 then determines the amount (e.g., percent) of frames in which deviation from the baseline has been detected and determines an unsafe state of a driver (e.g., distracted or drowsy driver) based on the accumulated data. For example, an unsafe state of a driver may be determined if more than 80% of the 60 frames show a deviation from the baseline values.

In some embodiments distraction may be detected, for example, by identifying the direction of the driver's head and eyes to determine if the driver is looking in the correct direction (e.g. at the road) or not.

In another embodiment, distraction of the driver may be detected based on input from the sensor 11 or from another device, which is not related to biometric parameters of the driver. For example, a driver may be using his cell phone, tablet or other devices in vehicle 14 (e.g., the vehicle infotainment system), while he should be concentrating on driving. Thus, input from these devices may be used to detect an unsafe state of the driver.

An alert signal generated by processing unit 10 based on detection of an unsafe state of the driver, may be an alarm signal to warn the driver of his unsafe state. Alternatively, or in addition, the signal may be used to control another device. For example, if an unsafe state of a driver is determined, an alarm to alert the driver may be generated and/or a signal may be generated to control a device such as a collision warning/avoiding system associated with the vehicle.

In some embodiments the system 100 includes a location tracker 19, e.g. a GPS system, to provide location coordinates of the vehicle 14. Typically, the location coordinates can be correlated to the information (e.g., image data) collected by sensor 11.

In some embodiments the system 100 includes a calibration processor to determine the driver's head 15 position with respect to the sensor 11 and use the driver's head position with respect to the sensor to calibrate the sensor 11 for future sensing.

In some embodiments the calibration processor receives indication (e.g., from the location tracker 19) that the driver is driving, namely that the vehicle is moving (e.g., above a predetermined speed for above a predetermined time) and based on the indication, it may be determined that the driver's face and eyes (which may be detected in images using known image analysis algorithms (e.g., shape or face or eye detection algorithms)) are directed straight ahead. Thus, in some embodiments, when indication that the driver is driving is received, the calibration processor determines the driver's head position with respect to the imager included sensor 11 and uses the driver's head position with respect to the imager to calibrate the imager. Using this information, the driver's head 15 position may be detected for any location of the sensor 11 in the vehicle 14.

In another embodiment, indication (e.g., from the location tracker 19) that the vehicle is moving is required in order to send information regarding an unsafe state of a driver to remote device 17.

All or some of the units, such as sensor 11, driver input unit 16 and location tracker 19 may be part of a standard multi-purpose computer, including mobile devices such as smart phones or tablets.

As described above, detection of a person's unsafe state generates a signal to transmit information relating to the person's state to a remote device. Thus, a remote device and/or external user of the remote device receive, substantially in real-time, only the information relevant to an unsafe state of a person.

The system 100 enables to provide information of a driver's state by receiving from a sensor in a vehicle information of the driver's state, receiving a signal of an unsafe driver's state and based on the signal of unsafe driver's state, sending a portion of the information to a remote device. The signal of an unsafe driver's state may be received from the sensor 11 and/or from the driver input unit 16.

In one embodiment the unsafe driver's state is detected from image data of the driver (or of at least part of the driver) and the signal of unsafe driver's state is generated by the sensor or by a processor associated with the sensor, based on the detection.

As described above, the unsafe driver's state may be detected based on biometric parameter values of the driver that are derived from the image data.

Figure 2A:
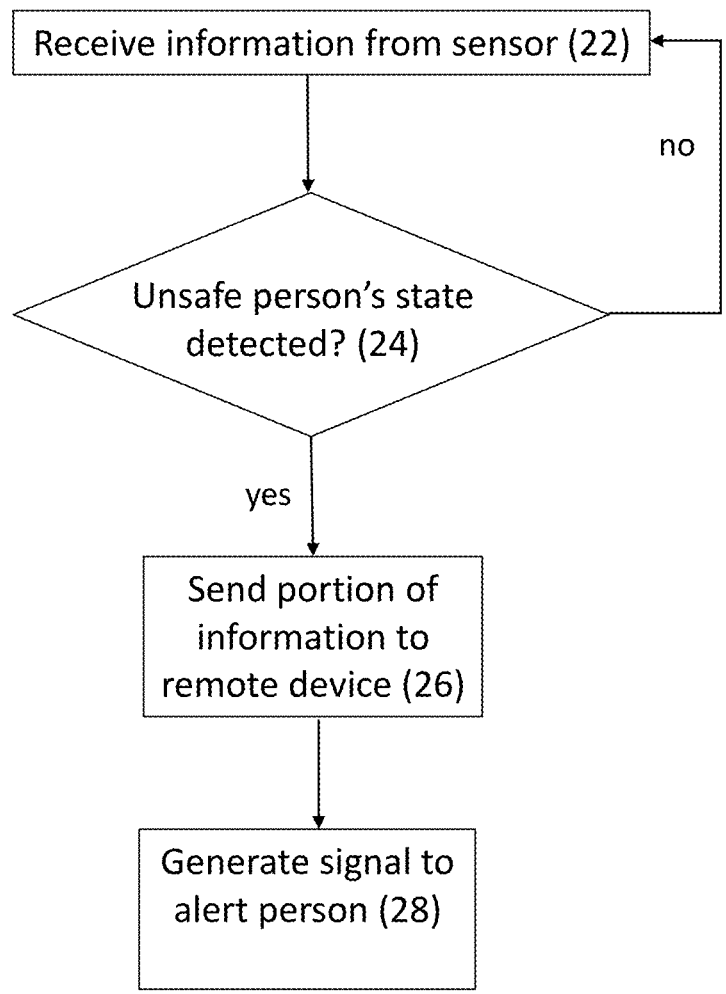
FIGS. 2A, 2B and 2C are schematic illustrations of methods for providing information of a person's state, according to embodiments of the invention.

In one embodiment, which is schematically illustrated in FIG. 2A, a method for monitoring a person includes receiving information from a sensor (22) designed to detect an unsafe person's state (e.g., sensor 11). If an unsafe person's state is detected (24) (e.g., based on image data of the person or based on input from the person, as described above) then a portion of the information is sent to a remote device (26). If an unsafe person's state is not detected the monitoring continues by receiving information from the sensor (22).

In one embodiment a signal may be generated to alert the person (28) if an unsafe state of the person is detected.

The signal to alert the person may be generated (28) concurrently with the sending of the portion of the information to the remote device (26).

In one embodiment the information collected by the sensor includes real time and/or stored image data of at least part of the driver's head and the portion of information sent to the remote device (e.g., from the sensor or from storage such as cloud storage) typically includes image data correlating to the unsafe driver's state, for example, images received when the unsafe person's state was detected (e.g., detected by a processor associated with the sensor or a processor at a remote location such as in the cloud).

In some embodiments a portion of the information is sent to a remote device upon the person's request, e.g., if the person feels drowsy or otherwise concerned about his state.

The portion of information sent to the remote device may include stored information and real time information. For example, a portion of information sent to a remote device may include a short video which includes images of the person obtained a few seconds before the detection of an unsafe state and the images obtained during the unsafe state event.

An unsafe state event may include all the image frames in which a distracted, stressed, drowsy or otherwise hazardous state of a person is detected, e.g., based on biometric parameters indicative of the person's state. Typically, an event of unsafe state of a person is detected using an image analysis algorithm, as described above. For example, distraction of a person such as a driver, may be detected based on the yaw and pitch of the driver's head over a certain time. Drowsiness may be detected based on the status of the driver's eyes (open/closed), perclos, and head movements, mirror checks according to head movements, etc.

As described above, the remote device may be a device configured to display information to a remote user or a data center where information may be stored and accessed by an external user for further analysis and/or to update and improve algorithms run by the system. Thus, based on a signal of an unsafe driver's state or based on detection of the driver's unsafe state, a portion of the information is sent to a remote device to display the portion of information substantially in real-time and to another remote device to store the portion of information for later use.

Figure 2B:
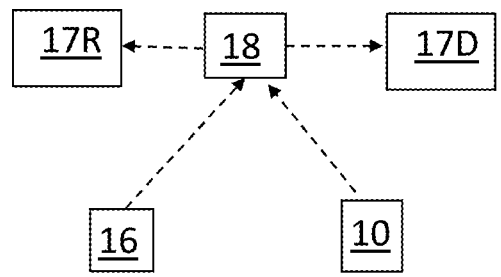
Figure 2C:
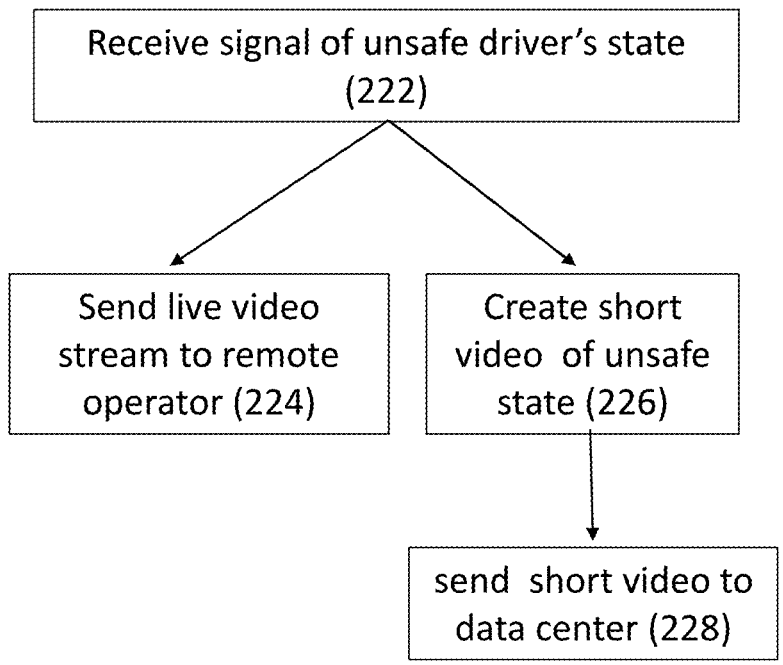

In one embodiment, which is schematically illustrated in FIGS. 2B and 2C, a signal of an unsafe driver's state is received (222), for example at controller 18. The signal of unsafe driver's state can be generated by a processing unit connected to a sensor, such as processing unit 10 and/or based on input from the driver, for example by driver input unit 16 and/or based on input from another device, e.g., as described above.

As a result of receiving a signal of an unsafe driver's state, a live video stream is sent to a remote operator device (224), for example, device 17R and a short video capturing the unsafe state is created (226) and sent to a data center 17D. The signal of unsafe driver's state may also cause an alarm signal to be generated.

In one embodiment transmission of information from a specific sensor to a specific remote device is enabled and coordinated (typically by controller 18) by use of matching or corresponding IDs from both sensor and remote device. The typically unique IDs may be identical or may otherwise match or correspond to each other. Thus, sending a portion of information to a remote device is typically based on a correspondence between the sensor and the remote device.

Figure 3:
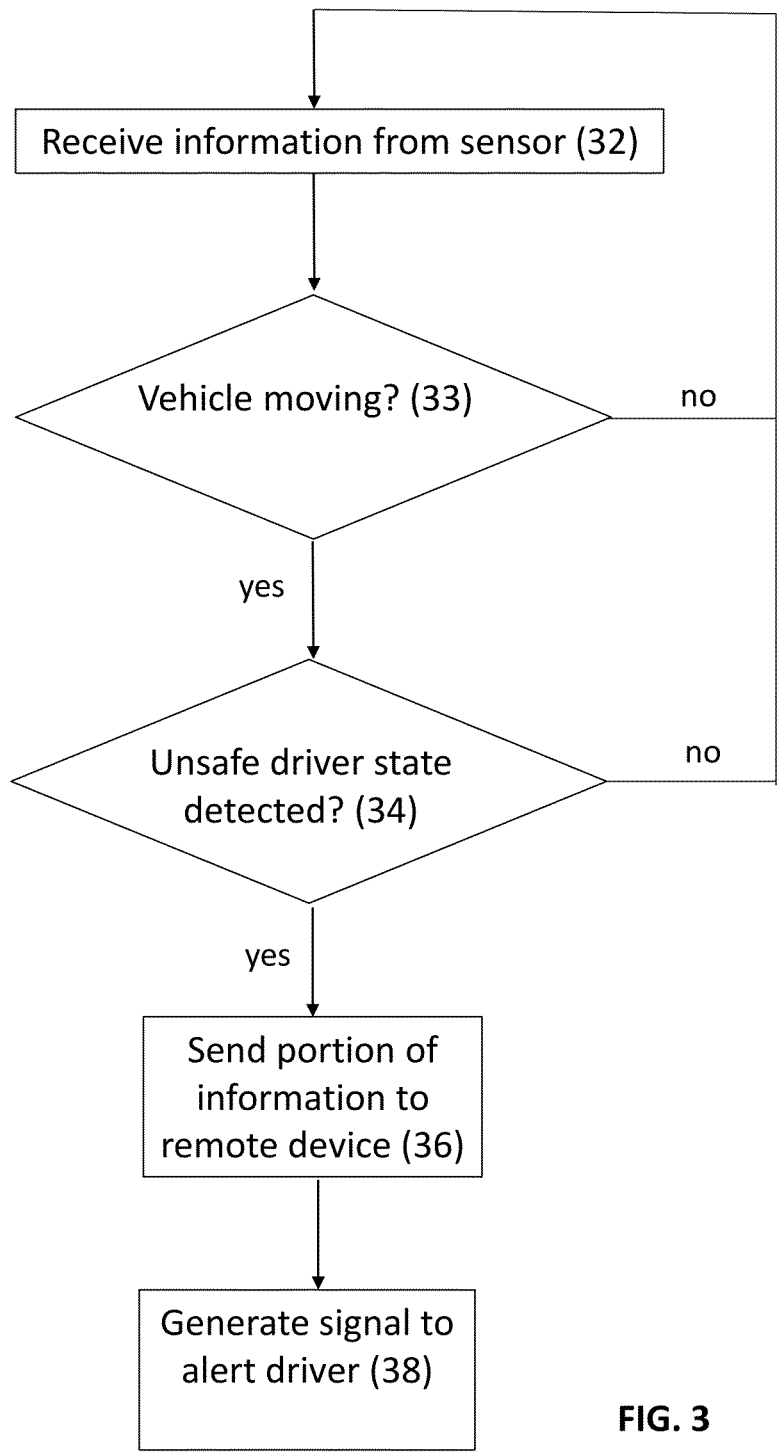
FIG. 3 is a schematic illustration of a method for monitoring a driver's state in a vehicle, according to an embodiment of the invention.

In one embodiment, which is schematically illustrated in FIG. 3, a method for monitoring a driver in a vehicle includes receiving information from a sensor (32) designed to detect an unsafe driver's state in the vehicle (e.g., sensor 11). If it is determined that the vehicle is moving (33) (e.g., at a predetermined acceleration or above a predetermined speed for more than a predetermined period) and if an unsafe driver's state is detected (34) (e.g., based on image data of the driver or based on input from the driver, as described above) then a portion of the information is sent to a remote device (36). If the vehicle is not moving (33) and/or an unsafe driver's state is not detected (34) the monitoring continues by receiving information from the sensor (32).

A signal may be generated to alert the driver in the vehicle (38) after, before or concurrently with the sending of a portion of the information to the remote device (36).

For example, an alarm may be triggered in the vehicle based on the generated signal and/or a collision warning/avoiding system associated with the vehicle may be activated based on the generated signal.

In some embodiments input from the location tracker 19 or another device (e.g., an accelerometer or the speed detector of the vehicle) is used to determine that the vehicle is moving (e.g., above a predetermined speed for above a predetermined time).

The method may also include receiving input from a location tracker (e.g., location tracker 19) which is connected to the vehicle (or to the sensor) and including location coordinates from the location tracker in the portion of information sent from the sensor and/or transmitted to the remote device. In some embodiments the location coordinates are correlated to images to provide a geographical location for an imaged unsafe driver state event.

The embodiments exemplified above enable efficiently monitoring the driver's state at a remote device since it is possible to send only image data (or other information) relevant to a driver's unsafe state to the remote device, thereby limiting the amount of information being sent to the remote device, and the amount of live monitoring time needed. Also, these solutions help to protect the driver's privacy by limiting the information, regarding the driver, which is sent to a remote device, to a necessary minimum.

In some embodiments, information or portions of the information sent from the sensor are stored in a database which is accessible to an external user so that the information in the database may be analyzed and used by the external user.

Figure 4A:
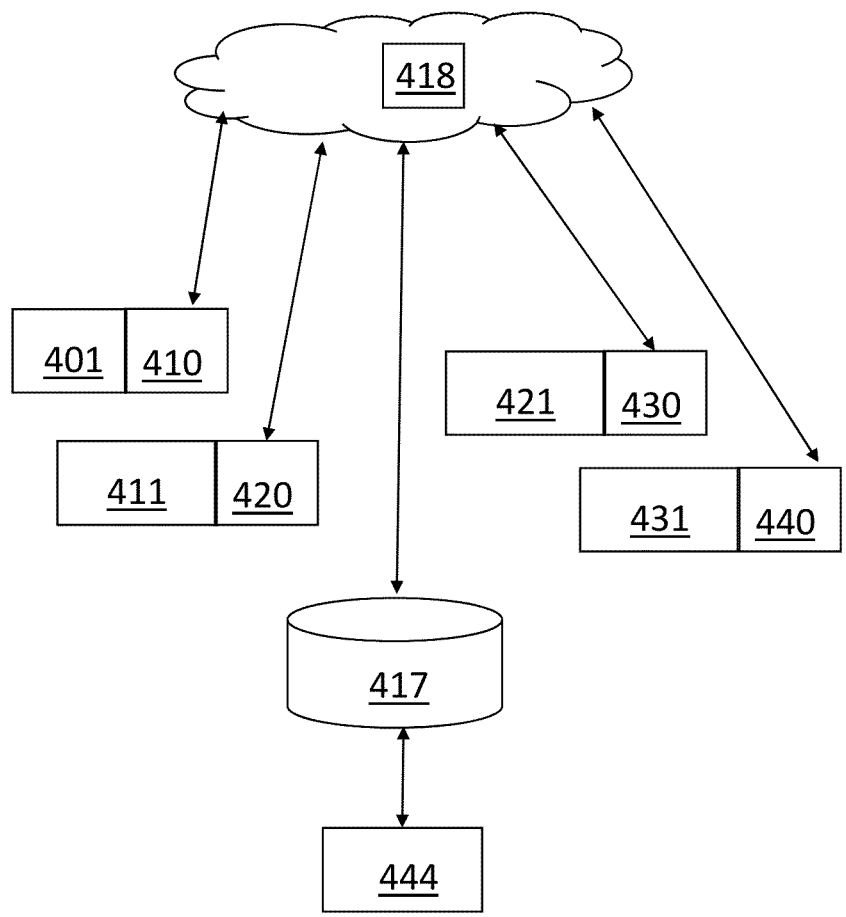
FIGS. 4A and 4B are schematic illustrations of a system and method for using information to update and improve driver state monitoring systems, according to embodiments of the invention.

In one embodiment, which is schematically illustrated in FIG. 4A, a plurality of image sensors 401, 411, 421 and 431 include processors 410, 420, 430 and 440, respectively. Each of processors 410, 420, 430 and 440 runs image processing algorithms to detect an unsafe state of a driver from the image data obtained by its respective image sensor. Based on detection of an unsafe driver's state each of the processors 410, 420, 430 and 440 may mark specific images as "unsafe state images" and/or generate an alert signal in connection with the specific images.

Information including image data obtained from the image sensors and signals generated by the processors (as well as other information such as the sensors' unique ID) is sent to server 418. At server 418 images (or other image data) marked as "unsafe state images" or images correlated with an alert signal or otherwise identified as images correlating to an unsafe state event, are directed to a data center, typically including a database 417. Thus, database 417 contains information relating to unsafe state evens of drivers.

A processor 444, which may access database 417, may also receive indications (e.g., from an external user) if the marking of an image (e.g., by one of processors 410, 420, 430 or 440) as an image related to an unsafe state event, is true or false. The indications may be used, e.g., by processor 444, to update algorithms and processes at processors 410, 420, 430 and 440, to improve image analysis and detection processes at these processors.

Figure 4B:
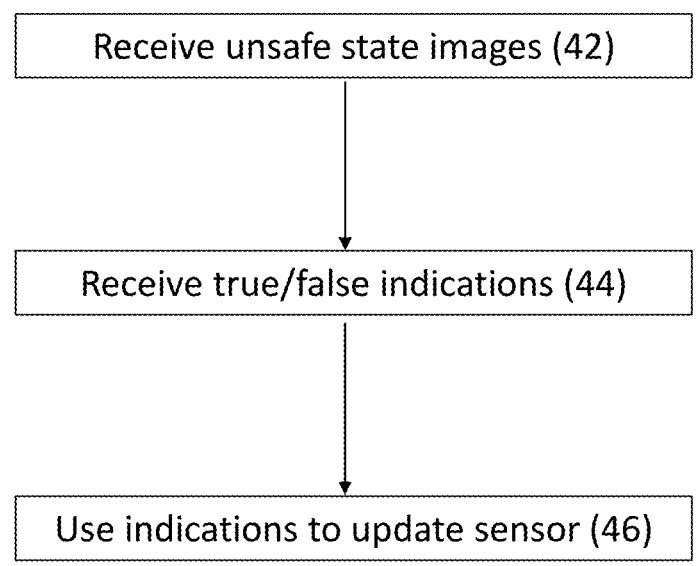

In one embodiment which is schematically illustrated in FIG. 4B, a method for updating a driver state sensor includes receiving unsafe driver's state image data (42) (namely, image data of a driver that is related to the driver's unsafe state, e.g., images obtained a few minutes or seconds before the detection of an unsafe state and the images obtained during the unsafe state event) and receiving a true or false indication of the unsafe state images (44). The true or false indications are then used to update the driver state sensor (46). For example, the true and false indicated images or parts of images may be used as true and false examples for a machine learning process employed to detect a driver's unsafe state, according to embodiments of the invention.

Embodiments of the invention enable remote monitoring of a driver's state using multi-purpose devices and can thus offer an economical solution to remote driver monitoring.

What is claimed is:

1. A system for remote monitoring of a driver, the system comprising:
    a sensor configured to obtain image data of at least part of the driver; and
    a processor in communication with the sensor, the processor to detect from the image data an unsafe driver's state event in real time and to generate a signal to send to a remote device, a live stream of images capturing the driver's unsafe state event.

2. The system of claim 1 wherein the processor is to detect the unsafe driver's state event based on biometric parameter values of the driver, the biometric parameter values derived from the image data.

3. The system of claim 2 wherein the biometric parameters comprise one or more of: eye pupil direction, pupil diameter, head rotation, blink frequency, blink length, mouth area size, mouth shape, percentage of eyelid closed, location of head, head movements and pose of the driver.

4. The system of claim 1 wherein the processor is part of an already existing vehicle processor.

5. The system of claim 1 comprising a location tracker to provide location coordinates which correspond to the image data.

6. The system of claim 1 comprising a driver input unit to accept input from the driver and to generate the signal to send a portion of the image data to a remote device based on the input from the driver.

7. The system of claim 1 wherein the live stream of images comprises images obtained during the driver's unsafe state, and wherein the remote device is configured to display the stream of images substantially in real-time.

8. A method for providing information of a driver's state, the method comprising:
    receiving from a sensor in a vehicle information of a driver's state, the information comprising image data of at least part of the driver;
    receiving a signal of an unsafe driver's state; and
    based on the signal of an unsafe driver's state, sending to a remote device a live stream of images capturing an unsafe state event of the driver.

9. The method of claim 8 comprising sending the live stream of images to the remote device based on matching IDs of the sensor and the remote device.

10. The method of claim 8 comprising:
   storing the live stream of images in a database; and
   enabling analysis of the images from the database by an external user.

11. The method of claim 8 wherein the live stream of images comprises images obtained during the unsafe state event of the driver.

12. The method of claim 8 comprising:
   detecting the unsafe state event of the driver from the image data of at least part of the driver; and
   generating the signal of unsafe driver's state based on the detection.

13. The method of claim 12 comprising detecting the unsafe state event based on biometric parameter values of the driver, the biometric parameter values derived from the image data.

14. The method of claim 11 wherein the live stream of images comprises image data correlating to the unsafe state event of the driver and location coordinates which correlate with the image data.

15. The method of claim 8 comprising receiving the signal of an unsafe driver's state from the sensor.

16. The method of claim 8 comprising receiving the signal of an unsafe driver's state based on driver input to an input device.

17. The method of claim 8 wherein the live stream of images comprises images obtained during the unsafe state even of the driver, and comprising, based on the signal of an unsafe driver's state, sending the images obtained during the unsafe state even of the driver to a remote device configured to display the the images obtained during the unsafe state even of the driver in substantially real-time and to a remote device configured to store the images for later use.

18. The method of claim 10 comprising:
   receiving from a processor a mark of an image as an unsafe state image;
   receiving an indication from the external user if the mark is true or false; and
   improving image analysis based on the indication from the external user.

* * * * *